3,806,544
ACETIC ACID PROCESS
Shigeto Suzuki, San Francisco, Calif., assignor to Chevron Research Company, San Francisco, Calif.
No Drawing. Filed Oct. 21, 1971, Ser. No. 191,342
Int. Cl. C07c *51/32, 53/08*
U.S. Cl. 260—533 R                                3 Claims

ABSTRACT OF THE DISCLOSURE

A process is disclosed for the production of acetic acid by the liquid phase reaction of ethylene with water and sulfur. Ammonia promotes the reaction. Reaction temperatures are in the range 225 to 400° C.

THE INVENTION

This invention relates to a process for the production of acetic acid.

Acetic acid is well known and has many uses in the art.

It has now been found that acetic acid is produced by heating in the liquid phase a mixture of ethylene, water and sulfur at a temperature in the range from about 225° C. to 400° C., preferably 250° C. to 350° C., for a reaction period in the range 0.1 to 10 hours. The pressure must be sufficient to maintain the required liquid phase, i.e., a pressure in the range from the autogenous pressure at the reaction temperature up to 5000 p.s.i.g. For each mol of ethylene, the mixture may contain an amount of water in the range 2 to 100 mols, preferably 5 to 50 mols; and an amount of sulfur in the range 0.5 to 5 mols, preferably 1.8 to 2.8. Ammonia appears to be a promoter for the reaction. For each mol of ethylene, the mixture desirably contains an amount of ammonia in the range .01 to 1 mol, preferably 0.1 to 0.5 mol.

Although hydrogen sulfide is a product of the reaction which may be summarized:

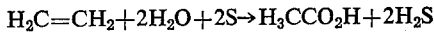
$$H_2C=CH_2+2H_2O+2S\rightarrow H_3CCO_2H+2H_2S$$

the presence of added hydrogen sulfide is advantageous in a batch reaction or in the start-up of a continuous process. In these cases for each mol of ethylene, an amount of hydrogen sulfide or of sodium sulfide per mol of ethylene in the range 0.01 to 0.5, preferably 0.1 to 0.4, is desirably added to the reactants.

EMBODIMENT

In a preferred embodiment, ethylene is converted to acetic acid in a high pressure autoclave reactor fitted for efficient mixing and for heating and temperature control. A charge of ethylene, sulfur, water, ammonia, and hydrogen sulfide in the mol ratio 1:2.6:11:0.33:0.3 is maintained in the reactor at a temperature of about 325° C. for a period of one hour at which time the conversion of the ethylene is essentially completed. The resulting product is mainly acetic acid containing a minor amount of the main reaction intermediates, ethyl mercaptan, and diethylsulfide, an appreciable amount (about 20 mol percent based upon ethylene charged) of acetamide, and hydrogen sulfide. The reaction product mixture is conveniently separated by venting the hydrogen sulfide and fractionally distilling the bottoms. Where a maximum yield of acetic acid is desired, the separated intermediates, ethyl mercaptan and diethylsulfide, are recycled to the process, and the acetamide is hydrolyzed to acetic acid and ammonia. The reaction is a liquid phase conversion of ethylene. Hence, the pressure in the reaction system must be sufficient to maintain water in a liquid phase at the reaction temperature. Thus, the pressure may range from that pressure which is the autogenous pressure for the mixture of reactants up to about 5,000 p.s.i.g. Higher pressures may, of course, be employed but no advantage and considerable extra cost results from such use.

Useful temperatures for the practice of the process vary over a range from about 225 to 400° C. The usual time-temperature relationship holds. That is, for each 10° increase in the temperature, the reaction rate approximately doubles. In general, satisfactory reaction times will be in the range from 0.1 to 10 hours in duration, preferably 0.2 to 3 hours.

The amount of sulfur required for a satisfactory conversion varies. In general, a useful result is experienced when for each mol of ethylene an amount of sulfur in the range 1 to 5 mols is used. The stoichiometric requirement (see the equation above) is 2 mols. The preferred range is 1.8 to 2.8 mols of sulfur per mol of ethylene. Larger relative amounts of sulfur may be employed, but such use is in general not advantageous. The sulfur functions as an oxidizing agent in the process.

Water is believed to be polyfunctional in the subject process. By reference to the equation above, it is to be noted that 2 mols of water are required for each mol of acetic acid produced. The water is the source of the carboxyl oxygen. Water also serves as a medium for the reaction. The use of an amount of water in the range from 5 to 50 mols of water per mol of ethylene charged appears to be most advantageous. Satisfactory results obtain at water to ethylene mol ratios in the range from about 2–100 to 1, respectively. Larger relative amounts of water may be employed; however, such use is relatively inefficient in view of the dilution of the reaction system.

The amount of ammonia or of a similar nitrogen base, such as an amine, pyridine and the like, which may be present in the reaction mixture is desirably relatively minor compared to the water or ethylene. Since ammonia can interact with the desired acetic acid product to form acetamide, a side product which must be hydrolyzed to obtain the desired acetic acid, the amount of ammonia in the reaction system per mol of ethylene should be relatively small, i.e., be in the range .01 to 0.5 mol, preferably .02 to 0.2 mol.

Diluents, such as benzene, saturated alkane hydrocarbons and the like, may be employed in the subject process. These diluents, in general, offer no particular advantage relative to the use of water as a diluent and reactant, particularly since in the use of the former, an added component is present in the system.

The following examples further illustrate the invention. The reactions were carried out under the indicated conditions and with the results as noted in table below.

TABLE I.—SULFUR OXIDATION OF ETHYLENE PROCESS

| Example number | Reactants (moles) | | | | | Conditions | | | Yield, mole percent | | |
|---|---|---|---|---|---|---|---|---|---|---|---|
| | Ethylene | Water | Sulfur | Ammonia | Hydrogen sulfide | Temp. (° C.) | Time (min.) | Pressure (p.s.i.g.) | Acetic acid | Ethyl mercaptan diethyl- sulfide | Acetamide |
| 1 | 1 | 10.9 | ¹2.6 | 0 | 0 | 330 | 60 | 4,400 | 42.3 | 0.5 | 0 |
| 2 | 1 | 10.9 | 2.6 | 0.06 | 0.04 | 325 | 60 | 4,100 | 44.2 | 0.25 | 0.9 |
| 3 | 1 | 10.5 | 0.7 | 0.41 | 0.24 | 300 | 20 | 2,000 | 7.6 | 85.8 | 0 |
| 4 | 1 | 10.5 | 0.7 | 0.41 | 0.27 | 320 | 35 | 2,730 | 15.0 | 61.6 | 8.1 |
| 5 | 1 | 9.6 | 1.9 | 0.37 | 0.27 | 325 | 30 | 3,700 | 56.3 | 21.7 | 12.5 |
| 6 | 1 | 10.6 | 2.6 | 0.33 | 0.26 | 326 | 60 | 4,000 | 72.1 | 1.3 | 19.3 |

¹ Also charged 0.13 moles of sodium sulfide.

The examples above support the following conclusions:
(1) Useful yields are obtained in the process in the absence of ammonia;
(2) The presence of ammonia in the reaction system is advantageous;
(3) Appreciable yields of acetic acid are obtained where the relative amount of sulfur to ethylene is less than 1;
(4) The use of a moderate excess of sulfur relative to the ethylene, that is over the stoichiometric requirement, is advantageous.

Ethyl mercaptan and diethyl sulfide are reaction intermediates in the subject process. These compounds can be recycled to the process. When this is done the yield of acetic acid approaches 100 ml. percent based upon the ethylene charged. On a once-through basis the yield of acetic acid may be as high as 72 percent.

It will be readily appreciated from the foregoing disclosure and examples that variations can be made by those skilled in the art without departing from the scope and spirit of the appended claims.

What is claimed is:
1. The process for the production of acetic acid from ethylene, consisting essentially of reacting ethylene with sulfur by contacting a mixture of said reactants in water in the liquid phase, said contacting being at a temperature in the range from about 225° C. to 400° C. for a period in the range from about 0.1 to 10 hours, wherein for each mol of ethylene said mixture contains an amount of sulfur in the range from about 0.5 to 5 mols, an amount of water in the range from about 2 to 100 mols, an amount of ammonia in the range from about 0.01 to 0.5 mols, and an amount of hydrogen sulfide in the range from about 0.01 to 0.5 mols.

2. The process as in claim 1 wherein said reaction temperature is in the range from about 250° C. to 350° C., said amount of sulfur is in the range from about 1.8 to 2.8, said amount of water is in the range from about 5 to 50 mols, and said reaction period is in the range from about 0.2 to 3 hours.

3. The process for the production of acetic acid from ethylene, consisting essentially of reacting ethylene with sulfur by contacting a mixture of said reactants in water in the liquid phase, said contact being at a temperature of about 326° C. for a period of about 1 hour, wherein for each mol of ethylene said mixture contains about 2.6 mols of sulfur, about 10.6 mols of water, about 0.3 mol of ammonia and about 0.3 mol of hydrogen sulfide.

References Cited

UNITED STATES PATENTS

| | | | |
|---|---|---|---|
| 2,903,480 | 9/1959 | Toland | 260—523 |
| 2,900,412 | 8/1959 | Toland | 260—533 |

FOREIGN PATENTS

| | | | |
|---|---|---|---|
| 542,118 | 6/1957 | Canada | 260—533 |

LORRAINE A. WEINBERGER, Primary Examiner

R. D. KELLY, Assistant Examiner

U.S. Cl. X.R.

260—561 R, 609 R